UNITED STATES PATENT OFFICE 2,242,763

PROCESS FOR CALCINING COPPERAS

Benjamin A. Smith, Rocky River, Ohio, assignor to The C. O. Bartlett & Snow Company, Cleveland, Ohio, a corporation of Ohio No Drawing. Application September 3, 1938, Serial No. 228,404

1 Claim. (Cl. 23—177)

At best, the many attempts which have been made to reclaim the $SO_2$ and $SO_3$ content of copperas (the crystalline ferrous sulphate of iron of chemical symbol $FeSO_4 \cdot 7H_2O$) have been partially successful because of the peculiar property of this material to melt in its own water of crystallization and turn into a sticky mass. Also, because the evaporation of a relatively large quantity of this water of crystallization causes exceeding dilution of the acid subsequently made from the gaseous oxides of sulfur in either the chamber or contact acid processes.

In my co-pending application filed June 23, 1938, Serial No. 215,512, now Patent 2,143,805, I have disclosed a process whereby the copperas may be treated by simple drying operation to reduce the water of crystallization from its normal seven molecules to one or two molecules. This partially dehydrated material, when strongly heated, no longer melts in its remaining water of crystallization; furthermore, the water vapor driven off in this final calcination is but a small part of the gaseous oxides of sulfur at the same time produced, so the dilution is relatively slight and quite tolerable.

The ultimate calcination of the partially dehydrated copperas, takes place at temperatures ranging from 1400° to 1600° F., and a considerable amount of heat is required to effect the dissolution of the sulphate radical, over and above the heat required to raise the temperature of the partially dehydrated copperas to the calcination temperature. The reaction is

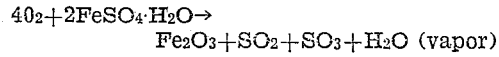
$$4O_2 + 2FeSO_4 \cdot H_2O \rightarrow Fe_2O_3 + SO_2 + SO_3 + H_2O \text{ (vapor)}$$

Air is admitted to the calcining apparatus to aid in the oxidation of the sulfur, and since air unavoidably contains nitrogen, the resultant gases are somewhat diluted by the inert nitrogen. Naturally, the size of the calcining apparatus and the chamber or contact process equipment for making the sulphuric acid must be made larger to handle the increased volume of gases produced by the dilution.

Thus, any undue dilution of the $SO_2$ and $SO_3$ gases increases the size and cost of the acid recovery equipment. Further, the operating expense is likewise increased.

The simplest and most economical way to provide the heat required to calcine the partially dehydrated copperas is to burn some common hydrocarbon or carbonaceous fuel in such a manner that the radiant heat from the flame, and the hot combustion gases directly impinge on or contact with the partially dehydrated copperas. No difficulty attends the calcining of this material by reason of supplying the heat in this manner, but the dilution of the gaseous oxides of sulfur by $CO_2$, $H_2O$ vapor, and further excess nitrogen from the combustion air is highly undesirable.

From this, it is seen that the common fuels normally used to supply heat, such as coal, oil and various gases, manufactured and natural, are unsuited to the simple direct calcination of the partially dehydrated copperas, when the gaseous oxides of sulfur are later used for the production of sulfuric acid.

One of the objects of the present invention is the calcination of copperas by a process that is productive of a minimum of water vapor, through the use of a fuel whose resultant products of combustion will not appreciably dilute the gaseous oxides of sulphur emanating from the copperas.

A further object is the utilization in such process of a fuel which is largely a by-product, is inexpensive and readily available, having at present only a limited field of use.

I have discovered that the intense heat liberated by the flash combustion of pyrite fines can be made to act on the partially dehydrated copperas, calcining the latter and greatly increasing the yield of the gaseous oxides of sulfur.

I have further discovered that by suitable control of the combustion of the pyrite fines and the rate of copperas calcination, the form of $SO_2$ and $SO_3$ can be regulated and the resulting gases at satisfactory temperature may be passed to the chamber or contact processes for making sulfuric acid.

To the accomplishment of the foregoing and related ends, my invention then consists of the steps hereinafter fully described and particularly pointed out by the claims, the following description setting forth in detail one approved method of carrying out the invention, such disclosed method, however, constituting but one of various ways in which the principle of the invention may be used.

As already indicated, I preferably calcine the partially dehydrated copperas by subjecting the same to the heat liberated by the flash combustion of such pyrite fines. To start such process, i. e., to preliminarily heat the combustion chamber and other parts of the apparatus, an auxiliary fuel may be used. While such fuel is burning, the resultant products of combustion may be by-passed around the acid-producing means and vented to the atmosphere.

Moreover, by suitable control of the combustion of the pyrite fines and the rate of copperas calcination, the formation of $SO_2$ and $SO_3$ can be regulated and the resulting gases, at satisfactory temperature, may be passed to the chamber or contact processes for making sulfuric acid without the necessity of employing waste heat boilers or similar cooling means to lower the combustion gas temperature as where such fines are employed directly as a source for the manufacture of sulfuric acid.

For positive maintenance of temperature under all conditions, it will be desirable to burn in the combustion chamber along with the pyrite fuel small quantities of one of the following supplemental fuels such as carbonaceous compounds, hydrocarbons or elemental sulfur.

As is well known, pyrite fines clog the normal grates of the chamber process, while a lump of pyrite will burn on grates like any solid fuel, provided air is admitted in like amount, and for this reason, lump pyrite has, for many years, formed one of the chief raw materials for the manufacture of sulfuric acid, by such process.

However, it has been found that these fines can be pulverized, mixed with air under slight pressure and blown into a combustion chamber, the combustion of the pyrite taking place almost instantly. Heat is rapidly liberated and combustion temperatures of about 1800° F. are readily attained. The pulverized pyrite burns in much the same manner as does powdered coal, and the resulting radiant heat and highly heated gases constitute extremely efficient heating means.

In the carrying out of my present improved process, a combustion chamber of any usual type may be employed for the calcination step; thus, the calcining vessel may take the form of rotary kilns, hearth furnaces, Wedge furnaces, Herreschof furnaces, or the like.

As indicated above, the pyrite will be introduced into the furnace in pulverized form mixed with the proper amount of air, any of the several accepted types of burner currently used for injecting the coal or other fuel into the combustion furnace being suitable for the purpose in hand.

The absoption of the heat generated by combustion of the pyrite incidentally to the calcination of the copperas has the desirable effect of reducing the high temperature of the combustion gases. Accordingly, these commingled with the gases resulting from the calcination step, may, after being cleaned, be conducted directly to the chamber or contact process for the manufacture of sulphuric acid.

As in the case of the furnace, so in the cleaning of the gaseous oxides of sulfur to free them from $Fe_2O_3$ dust, known processes and apparatus may be used; preferably, such cleaning will be accomplished by electrical precipitation chambers. Likewise, disposal of the by-product $Fe_2O_3$ which is recovered in the form of dust, may be effectuated by sintering the same, the sintered product lending itself as a source of iron in blast furnaces of steel mills.

Elemental sulfur is at present the source of most of the sulfuric acid of commerce. It has largely supplanted pyrite in this respect. However, the natural supply of elemental sulfur is limited, and its increasing scarcity will not only raise the price thereof, but will cause other sulfur-bearing materials to be used. Of these, copperas is one which is inexpensive and an increasing by-product of rolled steel and titaniferous pigment and other chemical manufactures. The supply of pyrite is still almost inexhaustible, as it is widely found in the form of pyrite ore, and as the gangue in which many metallic ores are carried, and from which it is separated by a crushing and flotation process.

From the foregoing description of my process, it will be seen that by utilizing as a source of heat for calcining copperas a material such as pyrite fines I am able not only to render such calcination more effective than heretofore has been possible, but, at the same time, the resultant gases are immediately available for use in sulphuric acid manufacture, either by the chamber or contact process.

As has been pointed out, in utilizing the heat of combustion of such pyrite to calcine the copperas, the temperature of the resulting gases can be reduced without the use of waste heat boilers or other similar cooling means to the point where they may enter at once the chamber or contact process. At the same time, I avoid the dilution of the $SO_2$ and $SO_3$ gases which occurs where ordinary fuels are used in calcining the copperas.

While the advantages of the process are realized to the greatest extent where pyrite fines constitute the fuel used, the improved results just noted from the operation of my process can be obtained by burning lump pyrite in the conventional manner. Other similar source of sulfur, in fact sulfur itself, if used in the furnace, would be effective to calcine the copperas and yield gases of combustion suitable for the manufacture of sulphuric acid.

Other modes of applying the principle of my invention may be employed instead of the one explained, change being made as regards the process herein disclosed, provided the step or steps stated by the following claim or the equivalent of such stated step or steps be employed.

I, therefore, particularly point out and distinctly claim as my invention:

A process of treating copperas to obtain gases suitable for use in the production of sulphuric acid, comprising partially dehydrating copperas and completely calcining the same substantially entirely, by subjecting it directly to the radiant heat and gases derived from the flash combustion of pyrites fines.

BENJAMIN A. SMITH.